United States Patent [19]

Willinger

[11] Patent Number: 4,633,656
[45] Date of Patent: Jan. 6, 1987

[54] DISK MOWER SUBSTANTIALLY PREVENTING SOIL ACCUMULATION ON ITS HOUSING

[75] Inventor: Joseph Willinger, Bouxwiller, France

[73] Assignee: Kuhn S.A., Saverne, France

[21] Appl. No.: 820,574

[22] Filed: Jan. 15, 1986

Related U.S. Application Data

[63] Continuation of Ser. No. 681,082, Dec. 13, 1984, abandoned, which is a continuation of Ser. No. 510,269, Jul. 1, 1983, abandoned.

[30] Foreign Application Priority Data

Jul. 9, 1982 [FR] France .................................. 82 12234

[51] Int. Cl.$^4$ ............................................. A01D 55/18
[52] U.S. Cl. .......................................... 56/13.6; 56/6; 56/295
[58] Field of Search .................... 56/1, 6, 13.6, 17.4, 56/192, 295, 314, 320, 320.1, DIG. 20

[56] References Cited

U.S. PATENT DOCUMENTS 4,103,476  8/1978  Oosterling et al. ................. 56/13.6
4,426,828  1/1984  Neuerburg ............................ 56/6

FOREIGN PATENT DOCUMENTS 456223  7/1968  Switzerland ........................ 56/192

Primary Examiner—Gene Mancene
Assistant Examiner—David I. Tarnoff
Attorney, Agent, or Firm—Marmorek, Guttman & Rubenstein

[57] ABSTRACT

In a disk mower which normally has a forward direction of movement and includes a housing, at least two disks rotatably mounted in the housing and operable thereabove, and wherein each disk includes at least one cutter, an entrainment device for the disks supported by the housing and adapted to be driven by a power source external to the housing, and a soil removal device located in a front portion of the housing as defined by the forward direction for reducing any accumulation of soil on the housing, the improvement includes a suspension device for suspending the soil removal device from the housing so as to allow the soil removal device to extend, at the front portion of said housing and as seen from above, completely within the area delimited by the trajectory of said cutters during rotation, and to have at least one degree of freedom of movement with respect to the housing to move along a substantially vertical direction and in an upwardly sense, thereby normally resulting in displacements and/or vibrations of the soil removal device in said substantially vertical direction and in said upwardly sense during operating of the disk mower, and wherein the displacements and/or vibrations of the soil removing device prevent any significant accumulation of soil at least near the front part of the housing.

35 Claims, 7 Drawing Figures

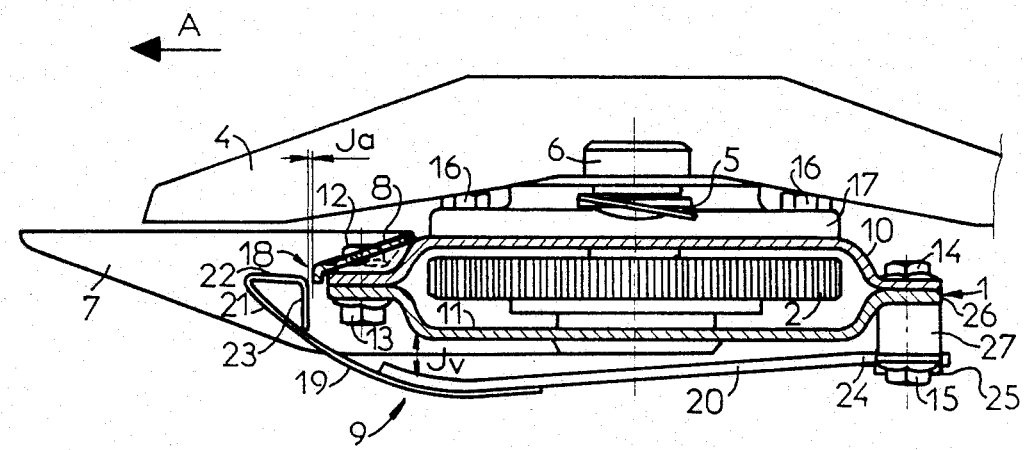
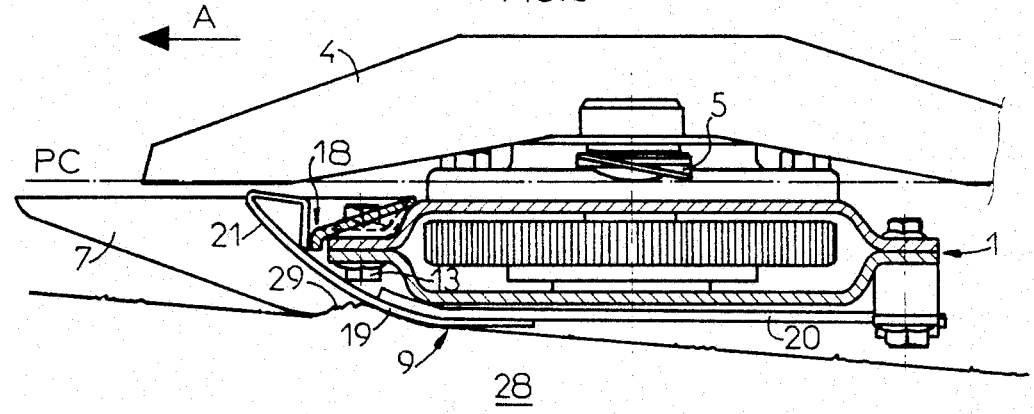
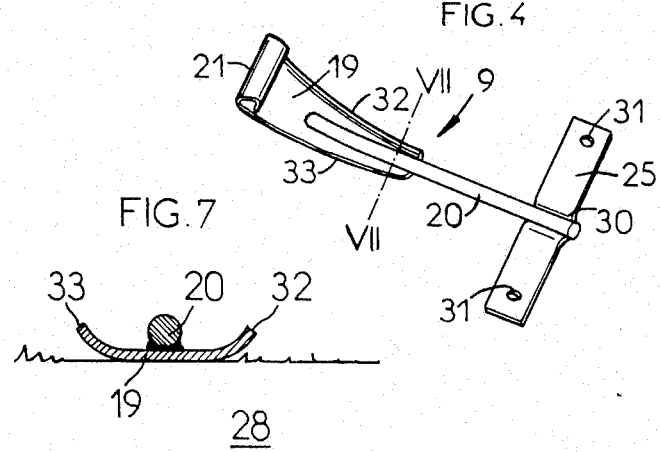

DISK MOWER SUBSTANTIALLY PREVENTING SOIL ACCUMULATION ON ITS HOUSING

This is a continuation, of application Ser. No. 681,082, filed Dec. 13, 1984 now abandoned, which is a continuation of application Ser. No. 510,269 filed July 1, 1983 now abandoned.

BACKGROUND OF THE INVENTION

1. Field of the Invention

The present invention relates to an improvement in a disk mower which includes a housing, at least two adjoining disks rotatably mounted in the housing, each provided with at least one cutter, an entrainment mechanism for the disks, and a soil removal device located in the front portion of the housing.

2. Description of the Prior Art

A disk mower suffers from the disadvantage that in damp land, or when the earth is relatively moist and sticky, there occur at the front portion of the housing of the mower and especially in locations between two neighboring disks, accumulations composed of a mixture of earth and fine stalks and the like of the cut vegetation. When these accumulations extend towards the front beyond the point of intersection of the outer trajectories of the cutting tools of the mower, the cutting tools can no longer cut the vegetation, which then accumulates in these locations, so that there remain in the field trails of uncut vegetation which, when plentiful, consequently represent a loss of that vegetation, or its end product, namely fodder. In order to reduce these losses, and to avoid a total clogging of the cutter bar of the mower, such accumulations must frequently be removed, which slows down the cutting of the vegetation considerably.

Furthermore, the trails of uncut vegetation create problems during subsequent operations. In fact, during tedding, any cut hay which remains in the vicinity of the trails of uncut vegetation cannot be properly turned over by the tedding machine, so that it will still be wet when being collected, which is detrimental for its proper conservation and storage.

Furthermore, during swathing, part of the dry hay raked by the swathing machine will remain clinging to the non-cut stalks. A similar phenomenon will occur during the collection of the swath of vegetation by the collecting machine if said swath of vegetation lies on any uncut trail, because the collector portion of the collecting machine will not be able to gather the entire cut vegetation, so that the volume of effective loss of vegetation will be greater still.

Moreover, at a subsequent cutting operation or second harvest, the previously uncut vegetation or old hay will be found to be already partly spoiled and mixed with the new vegetation, which has regrown again at those locations, which had been properly cut during the previous cutting operation. This in turn diminishes substantially the quality of the second harvest.

There is known a mower provided with disks which includes at the front part of the housing between two neighboring disks scrapers which scrape away any earth clinging to the cutters. For this purpose, these scrapers are provided with an inclined plane sloping towards the ground along which the earth removed from the cutters must glide downwardly without adhering to the inclined plane. In practice it has however become clear that although such scrapers reduce any earth accumulations slightly, they cannot prevent them altogether.

SUMMARY OF THE INVENTION

The present invention permits remedy of this disadvantage inasmuch as the device which prevents any earth accumulations on the housing of a disk mower as described includes means for suspending the soil removal device so as to permit it to extend at the front portion of said housing and as seen from above, completely within the area delimited by the trajectory of the said cutter during rotation, and to have at least one degree of freedom of movement in relation to the housing to move along a substantially vertical direction and in an upwardly sense.

In a mower, according to the present invention, and equipped with such a soil removal device, or mudscraper, accumulation of earth and fine stalks of cut hay no longer takes place, or at least, if it does take place, earth accumulations will not progress beyond a front rim of the device. In fact, there will be added to the continuous vibrations generated by the rotation of the disks to which the mudscraper is subjected, any movements of the mudscraper due to any obstacles on the ground forced upon the mudscraper by such obstacles during the gliding passage of the mower along the ground during cutting operations.

When the mower encounters such an obstacle, the mudscraper of the mower will be deflected upwardly from its normal position according to its at least one degree of freedom of movement, so that if an accumulation of earth had already started to form, the relative movement of the mudscraper in relation to the housing will again detach it from the housing. Taking into account the numerous obstacles present on the ground, the front portion of the housing should now always be clear at the critical locations. Moreover, when the mower is raised at the end of the field, the vibrations of the mudscraper will continue the scraping action along the front portion of the housing.

According to another characteristic of the invention, in a disk mower which normally has a forward direction of movement and includes a housing, at least two disks rotatably mounted in the housing and operable thereabove, and wherein each disk includes at least one cutter, entrainment means for the disks are supported by the housing and adapted to be driven by a power source external to the housing, and soil removal means are located in a front portion of the housing as defined by the forward direction for reducing any accumulation of soil on the housing, the improvement includes suspension means for suspending the soil removal means from the housing so as to allow the soil removal means to have at least two degrees of freedom of movement with respect to the housing.

According to a preferred embodiment of the invention, the suspension means for suspending the soil removal means from the housing allows the soil removal means to have elastically at least one degree of freedom of movement with respect to the housing.

This preferred embodiment of the invention permits to increase substantially the cleaning capacity of the soil removal means. In fact, if the soil removal means is remote upwardly from its normal position, the suspension means accumulates a certain quantity of energy, which it is able to restitute as soon as the obstacle has been cleared by the mower. Thus a forced displacement of the soil removal means, for example of a mudscraper in one sense results automatically in a forced displacement in the opposite sense as soon as the obstacle has been cleared by the mower, so that the resulting vibrations of the soil removing means prevent any significant accumulation of soil at least near the front part of the housing.

According to another additional characteristic feature of the invention, a further degree of freedom of movement of the mudscraper and particularly of its front rim, is transverse movement in relation to the forward direction of the mower. For this purpose there exists a certain play along the vertical direction, and a certain play along the forward direction of the mower between the housing and the mudscraper when the mudscraper is in a rest position. Furthermore, when the front portion of the housing is provided with disk protection means, a certain lateral play must exist between the mudscraper and the protective means, so that the aforesaid transverse movement can be realized. In practice it has been found that the amplitude of the transverse movement may be smaller than that of the movement in a substantially vertical direction, which implies that the amount of lateral play to be expected will be smaller than the play in the substantially vertical direction. One of the great advantages of the transverse movement is avoidance of any earth accumulations between the housing and the mudscraper, and avoidance of any blockage of movement of the mudscraper in a substantially vertical direction.

According to another additional characteristic feature of the invention, means are provided to limit the movement of the mudscraper along a substantially vertical direction, so that in its highest position the mudscraper still remains below the vegetation cutting plane. Thus damage of the mudscraper by the cutting blades is avoided.

BRIEF DESCRIPTION OF THE DRAWINGS

Other objects and advantages of the invention will be apparent from the drawings in conjunction with the following description, wherein:

FIG. 2 is a side view in cross-section of the cutter bar of FIG. 1, and wherein the cutter bar does not make contact with the ground;

FIG. 3 is a side view in cross-section of the cutter bar of FIG. 1, wherein the cutter bar rests on the ground in an operating position;

FIG. 4 is a perspective view of the disassembled mud removing device with which the cutter bar of FIGS. 1, 2 and 3 is provided;

FIG. 7 is a cross-section of the soil removal device taken along line VII—VII of FIG. 4.

DESCRIPTION OF THE PREFERRED EMBODIMENTS

Figure 1:
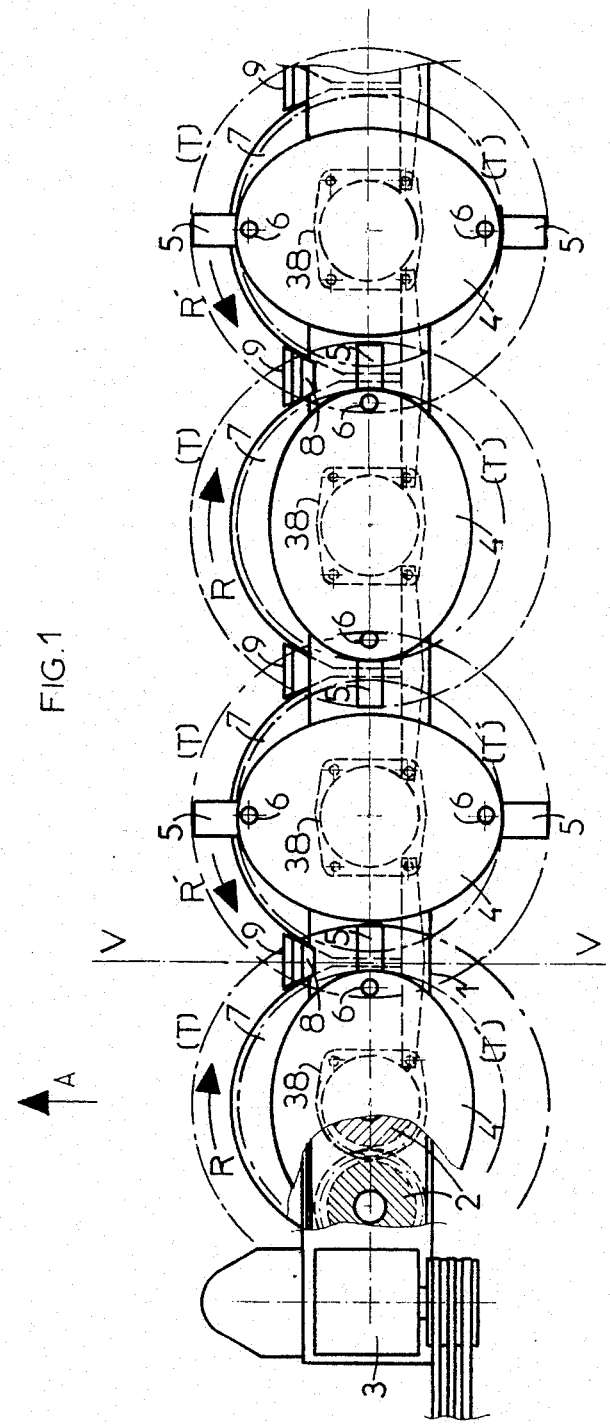
FIG. 1 is a top plan view of the cutter bar of a disk mower equipped with a soil removal device according to the invention.

Referring now to the drawings, FIG. 1 shows the cutter bar of a disk mower. This cutter bar includes a housing 1 wherein there is mounted a serie of toothed wheels 2 driven by the power of a (non-illustrated) tractor by means of a known mechanism 3, such as for example a gear box, pulleys and belts. The toothed wheels 2 drive disks 4. Each disk 4 is provided with two diametrically opposed cutters 5, each of which can turn freely about a corresponding axle 6 mounted in a disk 4. The cutters 5 are maintained in their operating position by the effect of centrifugal forces and therefore described circular trajectories T when the disks 4 are rotated. In front of the housing 1, as seen in forward direction A of the mower, there extend substantially under each disk 4 disk protection means, such as arcuate members 7 which have a radius slightly larger than the radius of the trajectories T' of the disks 4, but smaller than the radius of the trajectories T of the cutters 5. In this manner the disks 4 are protected from any obstacle present on the ground along which the mower operates. Only the cutters 5 are not protected, but as these are mounted so as to be freely rotatable on respective disks 4, the cutters 5 may retract below the disks 4 when they encounter an obstacle and can then resume their operating position as soon as the obstacle is cleared.

In front of the housing 1, between the first and second disks 4, as seen in the direction from left to right in FIG. 1, and between the third and fourth disks 4, at locations where the trajectories of the cutters 5 of the disks 4 begin to intersect as they rotate towards the housing 1, there are arranged protection members 8 the object of which is to protect the housing 1 from damage due to a cutter 5 possibly being bent when encountering an obstacle.

In the regions between two neighboring disks 4 there extend soil removal means, such as mud scrapers 9 which are displaceable substantially perpendicularly with respect to the plane of FIG. 1, and are displaceable laterally with respect to the forward direction A of the mower. This movement of the mud scrapers 9 with respect to the housing 1 substantially prevents earth accumulations which may otherwise form in these regions, and which may impair operation of the mower.

In FIG. 2 it will be seen that the housing 1 of the cutter bar is formed by two bent metal sheets 10 and 11, which are joined by fastening means, such as screws 12, 14 and nuts 13, 15, so as to form a cavity which receives the toothed wheels 2; the screws 12, 14 pass through the outer flanges of the housing 1. It is also possible to shape the housing 1 from a single suitably bent metal sheet and a flat metal sheet which are assembled in a manner similar to the aforedescribed manner. On the upper sheet 10 of the housing 1 are mounted disk bearings 17 by means of screws 16. The (non-illustrated) axles of the disks 4 are rotatably guided in the disk bearings 17. At the front portion 18 of the housing 1 there extend a protection member 8, and an arcuate member 7. Below the lower metal sheet 11, the housing 1 is provided with the mud scrapers 9, the front portion of which is formed by a plate 19 in the shape of a ski in such a manner that it can easily glide on the ground. Suspension means are provided for suspending the mud scrapers 9 from the housing 1, for example, a flexible shank 20 made of spring steel may be used, which permits displacement of the plate 19 at least in a substantially vertical direction, and in a direction transverse in relation to the direction A of the forward movement of the mower. The plate 19 is also capable of rotating or turning slightly about the longitudinal axis of the flexible shank 20; the shank 20 has advantageously a round cross-section.

The front rim 21 of the plate 19 includes a substantially horizontal portion 22 which terminates in a base portion 23 directed downwardly. The base portion 23 extends advantageously down to the plate 19, and is advantageously connected to the plate 19 by known mounting means, such as for example by brazing or welding. With such a shape the front rim 21 of the plate 19 is suitably reinforced in a simple and easily realizable manner against any shock and vibration it is called upon to withstand during operation of the mower. The back portion 24 of the flexible shank 20 is connected to a strap or clamp 25, the shape of which is best seen in FIG. 4, and which will be described later. The strap 25 is fastened to the back portion 26 of the housing 1 by means of fastening means, such as screws 14 and nuts 15 after at least one spacer 27, also passed through by the screw or screws 14, has been interposed between the strap 25 and the housing 1. Therefore the screws 14 at the rear part of the housing 1 are advantageously longer than the screws 12 at the front part of the housing 1. In the rest position of the mud scraper 9 there exists a certain play Jv, in a vertical direction, as well as a certain play Ja in the direction of advancement A of the mower between the housing 1 and the mud scraper 9, as best seen in FIG. 2. The diameter of the round cross-section of the flexible shank 20 ranges advantageously from 4 to 10 millimeters. This range of the aforesaid diameter represents the best compromise between the mechanical strength of the flexible shank 20 and its resistance to being clogged. By resistance of the flexible shank 20 to being clogged is meant that if earth accumulates between the housing 1 and the flexible shank 20, the shank 20 can, because of its relatively reduced diameter, easily pass through the earth accumulation so that the movement of the mud scraper 9 along a substantially vertical direction is not blocked.

In FIG. 3 the cutter bar is shown resting on the ground 28 by the arcuate members 7 making contact with the ground. The arcuate members 7 extend lengthwise below the housing 1 by forming (non-illustrated) runners. During operation, the cutter bar assumes a forwardly inclined attitude so that the cutters 5 can cut the hay relatively close to the ground. When the cutter bar rests on flat ground, it is advantageous that the flexible shank 20 is bent slightly upwardly so that the mud scraper 9 exerts a certain initial pressure on the ground 28.

When the mower is moved forwardly in the direction of the arrow A, vibrations set up due to the rotation of the disks 4 cause the mud scraper 9 to vibrate within its different degrees of play. When an obstacle 29 appears on the ground and comes into contact with the gliding portion of the plate 19, the plate 19 will be forced to yield upwardly and/or to the right or to the left according to whether the obstacle 29 comes into contact with the plate 19 on its right or left side. When an earth accumulation is formed at the front portion 18 of the housing 1, the earth accumulation is lifted and can end up in the operating zone of one of the cutters 5, namely above the cutting plane PC shown in FIG. 3, in such a manner that the cutters 5 can strike the earth accumulation and dissipate it by scattering it behind the housing 1. If the earth accumulation does not reach the cutting plane PC, there are the vibrations of the plate 19 which can detach the earth accumulation from its front rim 21. The movement of the plate 19 in a transverse direction, when it encounters an obstacle 29 is very advantageous to the extent that the earth which accumulates in the space between the plate 19 and housing 1, particularly at the place where the nut 13 is located, is again forced to be loosened from the plate 19 laterally by the movement of the plate 19.

The lateral disengagement movement of the earth from the plate 19 is further amplified by the shoving action of the front portion of the flexible shank 20 during its lateral displacement executed jointly with the plate 19, upon which it is mounted. Based on the fact that the plate 19 exerts a certain initial pressure on the ground 28, it will become clear that when the plate 19 passes above a hole in the ground it moves downwardly and eventually transversely in relation to the direction A. This movement also contributes to the detachment of any earth accumulation from the front portion 18 of the housing 1, and to the lateral disengagement of any earth accumulated between the housing 1 and the plate 19. Furthermore, when the suspension means by which the mud scraper 9 is suspended from the housing 1, such as the flexible shank 20 execute a slight pivoting movement about an axis directed substantially along the direction of movement of the mower, this movement also contributes advantageously toward dislodging any earth accumulations from the mower.

In fact, when the plate 19 pivots or turns about an axis substantially directed along the direction of movement A, the rim of the plate 19, which is in contact with the ground, permits any earth accumulation to be dislodged along the line of junction of the accumulation with one of the arcuate members 7.

From FIG. 3 it will also be observed that the displacement of the plate 19 in an upward direction is limited. This limitation is, for example, implemented, as seen in FIG. 3, by the front portion of the flexible shank 20 abutting against the bottom of the housing 1, but it may be implemented by any other means. Thus even when the plate 19 encounters an obstacle 29 which is excessively high, the front portion 21 of the plate 19 remains always below the cutting plate PC and there is no risk of any interference with the cutters 5.

In FIG. 4 the shape of the strap 25 can be seen in a more precise manner. It includes in its central portion a substantially arcuate recess 30 within which the back extremity of the flexible shank 20 is mounted to the strap 25, for example, by brazing.

The upper part of the flexible shank 20 is substantially located at the level of the upper face of the strap 25, but is disposed advantageously slightly higher than the upper face, so that during tightening of the nut 15 onto the threaded bolt 14, the top of the flexible shank 20 is firmly pressed against the spacer 27. The strap 25 will also be seen to have two holes 31 through which the screws 14 pass.

Furthermore, the lateral rims 32 and 33 of the plate 19 which substantially extend along the direction A of forward movement of the mower, are bent upwardly, as can be seen from FIG. 7. This permits the plate 19 to glide better on any stones which may be lying on the ground 28.

Figure 5:
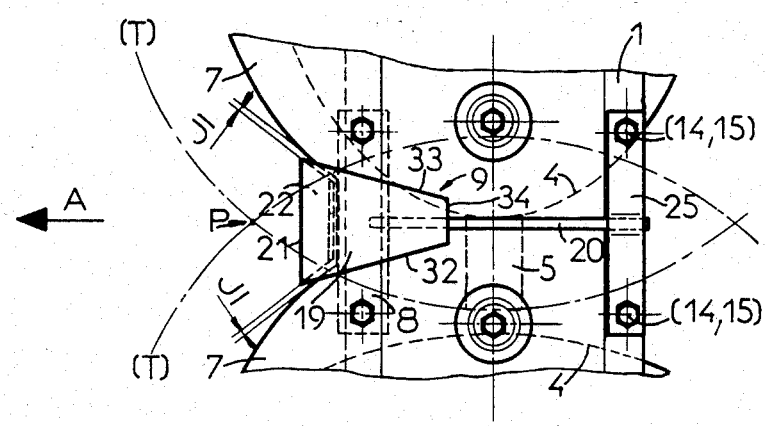
FIG. 5 is a bottom plan view of the cutter bar mounted in a housing assembled from metal sheets held together by screws and nuts and shows how the soil removal device is mounted on the housing.

In FIG. 5 there is illustrated the lower portion of the housing 1 and the mounting of the mud scraper 9 described hereinabove. The dimension of the plate 19 is such that its front rim 21 does not extend beyond the point of intersection P of the outer trajectories T which the cutters 5 follow during their rotation. Between the substantially horizontal portion 22 of the plate 19, and the two arcuate members 7, there exists a certain lateral play Jl so that some transverse movement and possibly at least a partial rotation about an axis extending substantially along the direction A of the movement of the mower of the mud scraper 9 can take place. In practice it became clear that the lateral play Jl may be smaller than the vertical play Jv, which means that the amplitude of the transverse movement of the mud scraper 9 may be smaller than its substantially vertically directed movement. Furthermore, the lateral rims 32 and 33 of the plate 19 converge advantageously in a direction opposite to that of the forward direction A of the mower, which means that the width of the plate 19 diminishes from its front rim 21 to its rear rim 34. As will be explained hereinafter, such a shape makes it more difficult for earth and fine stalks of hay to cling to the back portion of the lateral rims 32 and 33 in the vicinity of the rear rim 34. In fact, when the plate 19 passes over a molehill it will tend to dig thereinto a trench the size of which is substantially equal to the size of its front rim 21, so that the lateral rims 32 and 33 of the plate 19 can traverse the trench without touching the borders thereof, and therefore there is little risk that the earth will cling to the lateral rims 32 and 33 of the plate 19.

Figure 6:
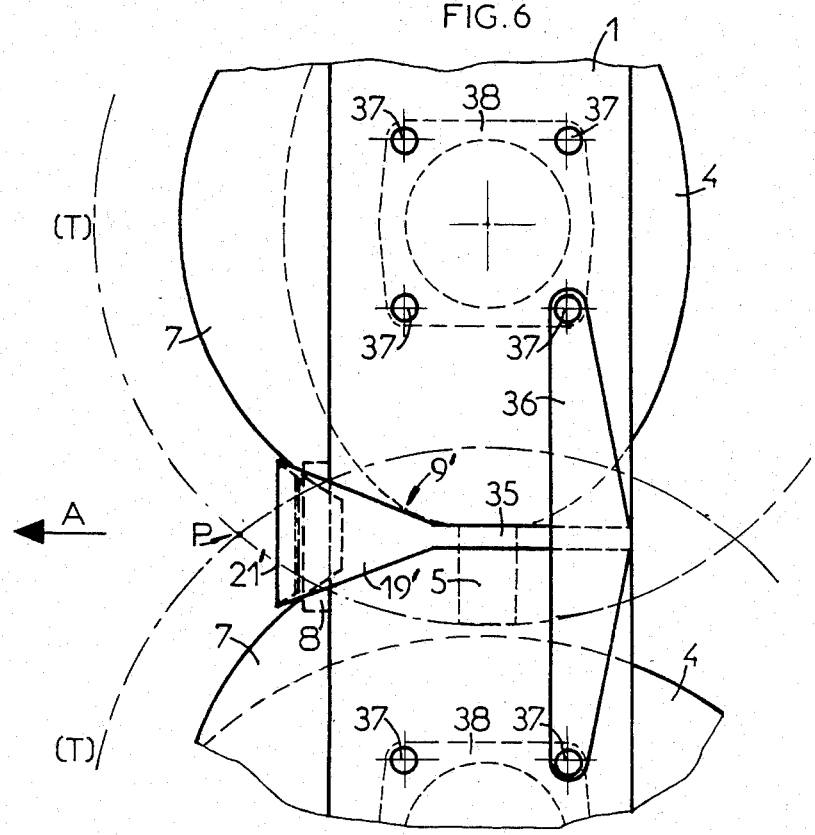
FIG. 6 is a bottom plan view of the cutter mounted in a housing assembled from metal sheets welded to one another and shows how a different version of the soil removal device is mounted on the housing.

FIG. 6 represents a modification of the mud scraper 9. The mud scraper 9' illustrated therein no longer includes a flexible shank or shaft 20 as in the previous example, but the flexible portion acting as suspension means is part of the plate 19' itself, which is formed in such a manner that its back portion is formed by a handle 35 of substantially constant cross-section, and which is mounted at the back on a plate 36. It will be understood that the handle 35 can be of any arbitrary shape. In particular, the periphery of its cross-section can be preferably round and approximate that of the flexible shank 20 of the previous example. The plate 35 is formed with two holes, each of which is passed through by one of the screws 37, the screws 37 mounting the disk bearings 38 onto the housing 1. The front portion of the plate 19' is identical to the one of the plate 19 of the previous example. The plate 19' could also be made more rigid. For this purpose it could advantageously be provided with a rib which could extend substantially along the length of its longitudinal axis. Such a rib could for example be realized by manufacturing an embossed plate 19', and at least one portion thereof, for example its rear portion could have a shape at least partly similar to the shape of the handle 35. Advantageously, the rib and the handle 35 could be connected in line with one another. This mode of implementing suspension means permit the plate 19 to execute a substantially vertical movement and a part rotational movement about an axis substantially directed along the direction A of forward movement of the mower. Any pivoting or part rotational movement of the mud scraper 9' will impair any earth accumulation between the housing 1 and the plate 19'.

I wish it to be understood that I do not desire to be limited to the exact details of construction shown and described, for obvious modifications will occur to a person skilled in the art.

Having thus described the invention, what I claim as new and desired to be secured by letters patent is as follows:

1. In a disk mower normally having a forward direction of movement and including a housing, at least two disks rotatably mounted in said housing and operable thereabove, each disk including at least one cutter, entrainment means for said disks supported by said housing and adapted to be driven by a power source, and soil removal means located in a front portion of said housing as defined by said forward direction for reducing any accumulation of soil on said housing, the improvement comprising suspension means for suspending said soil removal means from said housing so as to allow said soil removal means to extend, at the front portion of said housing and as seen from above, completely within the area delimited by the trajectories of the said cutter during rotation, and to have at least one degree of freedom of movement with respect to said housing, to move along a substantially vertical direction and in an upwardly sense, thereby normally resulting in displacements of said soil removal means in said substantially vertical direction and in said upwardly sense during operating of said disk mower, said displacements of said soil removal means preventing any significant accumulation of soil at least near said front part of said housing.

2. The disk mower as claimed in claim 1, wherein said suspension means allows said soil removal means to have at least two degrees of freedom of movement with respect to said housing.

3. The disk mower as claimed in claim 1, wherein said suspension means allows said soil removal means to have elastically at least one degree of freedom of movement with respect to said housing.

4. The disk mower as claimed in claim 3, wherein said suspension means is connected to said soil removal means and is made of resilient material.

5. The disk mower as claimed in claim 2, wherein a further degree of freedom of movement is the freedom of said soil removal means to move along a direction transverse to said direction of movement.

6. The disk mower as claimed in claim 2, wherein a further degree of freedom of movement is the freedom of said soil removal means to rotate at least partially about an axis extending substantially parallel to said direction of movement.

7. A disk mower as claimed in claim 5 or 6, wherein said soil removal means normally has a rest position, and wherein there exists a predetermined play along a substantially vertical direction, and a prearranged play along a direction parallel to said direction of movement between said soil removal means and said housing.

8. The disk mower as claimed in claim 7, wherein said predetermined play along said substantially vertical direction has a magnitude greater than said prearranged play along said direction parallel to said direction of movement.

9. The disk mower as claimed in claim 7, further comprising disk protection means located in said front portion of said housing, and wherein a certain lateral play exists between said soil removal means and said disk protection means.

10. The disk mower as claimed in claim 9, wherein said predetermined play along a substantially vertical direction between said soil removal means and said housing, exceeds said lateral play.

11. The disk mower as claimed in claim 1, further comprising limiting means for limiting the upwardly movement of said soil removal means along said substantially vertical direction.

12. In a disk mower normally having a forward direction of movement and including a housing, at least two disks rotatably mounted in said housing and operable thereabove, each disk including at least one cutter, entrainment means for said disks supported by said housing and adapted to be driven by a power source, and soil removal means located in a front portion of said housing as defined by said forward direction for reducing any accumulation of soil on said housing, the improvement comprising suspension means for suspending said soil removal means which includes a substantially ski-shaped longitudinal mud scraper plate from said housing so as to allow said soil removal means to extend at the front portion of said housing and as seen from above completely within the area delimited by the trajectories of the said cutter during rotation, and to have at least one degree of freedom of movement with respect to said housing, to move along a substantially vertical direction and in an upwardly sense, thereby normally resulting in displacements of said soil removal means in said substantially vertical direction and in said upwardly sense during operation of said disk mower, said displacements of said soil removal means preventing any significant accumulation of soil at least near said front part of said housing.

13. The disk mower as claimed in claim 12, wherein said plate has a predetermined length and a width varying as a function of said length.

14. The disk mower as claimed in claim 13, wherein the width of said plate is widest at a frontmost portion thereof, and decreases towards a rear part of said plate.

15. The disk mower as claimed in claim 12, wherein said plate has a frontmost part including a first member extending along a substantially horizontal direction.

16. The disk mower as claimed in claim 15, wherein said first member extends rearwardly along said substantially horizontal direction from the frontmost part of said plate, and further comprising a second member joined to a rear part of said first member and pointing downwardly.

17. The disk mower as claimed in claim 16, wherein said second member extends down to a part of said plate located rearwardly from said front most part thereof.

18. The disk mower as claimed in claim 17, wherein said second member is connected to said part of said plate located rearwardly from the frontmost part thereof.

19. The disk mower as claimed in claim 12, wherein said longitudinal plate extends along a direction substantially parallel to said direction of movement, and includes two longitudinal rims directed upwardly.

20. The disk mower as claimed in claim 12, wherein said suspension means include a flexible shaft made of spring steel.

21. The disk mower as claimed in claim 12, wherein said suspension means includes a handle integral with said plate.

22. The disk mower as claimed in claim 21, wherein said handle has a cross-section which is at least partly round.

23. The disk mower as claimed in claim 12, wherein said plate is formed with a rib substantially extending along a longitudinal axis thereof.

24. The disk mower as claimed in claim 23, wherein said rib has a cross-section which is at least partly round in at least a part thereof.

25. The disk mower as claimed in claim 23, wherein said suspension means includes a handle connected in line with said rib.

26. The disk mower as claimed in claim 1, wherein said housing has a rear part, said suspension means being connected to the rear part of said housing.

27. The disk mower as claimed in claim 26, wherein said housing includes two metal sheets forming a cavity therebetween and converging to two flanges at respective opposite ends, a plurality of first fastening means passing through each flange for tightening said metal sheets to one another, one of said flanges forming said rear part of said housing being connected to said suspension means by at least one of said first fastening means.

28. The disk mower as claimed in claim 26, wherein said housing includes two metal sheets forming a cavity therebetween and converging to two flanges at respective opposite ends, said metal sheets being connected to one another at said flanges, and further comprising disk bearings mounted on said housing for rotatably receiving shafts of said disks, and a plurality of second fastening means securing said disk bearings to said housing, said suspension means being connected to said rear part of said housing by at least one of said second fastening means.

29. The disk mower as claimed in claim 28, wherein said metal sheets are welded to one another at said flanges.

30. A soil accumulation prevention device for use in connection with a disk mower, said disk mower including a housing and at least two disks rotatably mounted in said housing and operable thereabove, each disk including at least one cutter, comprising in combination, soil removal means, and suspension means connected to said soil removal means and adapted to be suspended from said housing so as to allow said soil removal means to extend at the front portion of said housing and as seen from above, completely within the area delimited by the trajectories of the said cutter during rotation, and to have at least one degree of freedom of movement with respect to said housing to move along a substantially vertical direction and in an upwardly sense.

31. The soil accumulation prevention device as claimed in claim 30, wherein said suspension means allows said soil removal means to have at least two degrees of freedom of movement with respect to said housing.

32. The soil accumulation prevention device as claimed in claim 30, wherein said suspension means allow said soil removal means to have elastically at least one degree of freedom of movement with respect to said housing.

33. A disk mower normally having a forward direction of movement, comprising, in combination, a housing, at least two disks rotatably mounted in said housing and operable thereabove, each disk including at least one cutter, entrainment means for said disks supported by said housing and adapted to be driven by a power source, soil removal means located in a front portion of said housing as defined by said forward direction, and situated, at the front portion of said housing and as seen from above, completely within the area delimited by the trajectories of the said cutter during rotation, for reducing any accumulation of soil on said housing, and suspension means for suspending said soil removal means from said housing so as to allow said soil removal means to have at least one degree of freedom of movement with respect to said housing to move along a substantially vertical direction and in an upwardly sense, thereby normally resulting in displacements of said soil removal means in said substantially vertical direction and in an upwardly sense during operating of said disk mower, said displacements of said soil removal means preventing any significant accumulations of soil at least near said front part of said housing.

34. The disk mower as claimed in claim 33, wherein said suspension means allow said soil removal means to have at least two degrees of freedom of movement with respect to said housing.

35. The disk mower as claimed in claim 33, wherein said suspension means allows said soil removal means to have elastically at least one degree of freedom of movement with respect to said housing.

* * * * *